(12) United States Patent
Fang et al.

(10) Patent No.: US 12,160,007 B2
(45) Date of Patent: Dec. 3, 2024

(54) BATTERY CELL, BATTERY, POWER CONSUMPTION APPARATUS, AND MANUFACTURING METHOD AND DEVICE OF BATTERY CELL

(71) Applicant: CONTEMPORARY AMPEREX TECHNOLOGY (HONG KONG) LIMITED, Hong Kong (CN)

(72) Inventors: Kun Fang, Ningde (CN); Zhijun Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 260 days.

(21) Appl. No.: 17/724,587

(22) Filed: Apr. 20, 2022

(65) Prior Publication Data

US 2023/0118321 A1    Apr. 20, 2023

Related U.S. Application Data

(63) Continuation of application No. PCT/CN2021/125110, filed on Oct. 20, 2021.

(51) Int. Cl.
*H01M 50/14* (2021.01)
*H01M 50/136* (2021.01)
(Continued)

(52) U.S. Cl.
CPC ......... *H01M 50/14* (2021.01); *H01M 50/136* (2021.01); *H01M 50/147* (2021.01);
(Continued)

(58) Field of Classification Search
CPC .... H01M 50/14; H01M 50/10; H01M 50/531; H01M 50/136; H01M 50/317
See application file for complete search history.

(56) References Cited

U.S. PATENT DOCUMENTS

| 2010/0151317 | A1  | 6/2010 | Kim et al. | |
|---|---|---|---|---|
| 2011/0200870 | A1* | 8/2011 | Kim | H01M 50/567 |
|  |  |  |  | 429/179 |
| 2014/0186692 | A1  | 7/2014 | Kim et al. | |

FOREIGN PATENT DOCUMENTS

| CN | 214378715 U | 10/2021 |
|---|---|---|
| JP | 2008135263 A | 6/2008 |

(Continued)

OTHER PUBLICATIONS

International Search Report and Written Opinion dated Jun. 29, 2022 received in International Application No. PCT/CN2021/125110.

(Continued)

*Primary Examiner* — Kenneth J Douyette
(74) *Attorney, Agent, or Firm* — Scully, Scott, Murphy & Presser, P.C.

(57) ABSTRACT

The present application relates to a battery cell, a battery, a power consumption apparatus, and a manufacturing method and device of a battery cell. The battery cell includes: a shell comprising a wall part; an electrode assembly disposed within the shell; and an insulating member disposed between the electrode assembly and the wall part to isolate the wall part from the electrode assembly in an insulating manner. The insulating member is configured to elastically support the electrode assembly to buffer vibration of the electrode assembly within the shell.

17 Claims, 7 Drawing Sheets

(51) Int. Cl.
  *H01M 50/147* (2021.01)
  *H01M 50/317* (2021.01)
  *H01M 50/375* (2021.01)
  *H01M 50/531* (2021.01)
(52) U.S. Cl.
  CPC ....... *H01M 50/317* (2021.01); *H01M 50/375* (2021.01); *H01M 50/531* (2021.01); *H01M 2200/20* (2013.01); *H01M 2220/20* (2013.01)

(56) References Cited

FOREIGN PATENT DOCUMENTS

| | | | |
|---|---|---|---|
| JP | 2009289683 | A | 12/2009 |
| KR | 20100068080 | A | 6/2010 |
| WO | 2020190092 | A1 | 9/2020 |
| WO | 2022177379 | A1 | 8/2022 |

OTHER PUBLICATIONS

Extended European search report dated Jul. 1, 2024 received in European Patent Application No. 21876724.2.

\* cited by examiner

BATTERY CELL, BATTERY, POWER CONSUMPTION APPARATUS, AND MANUFACTURING METHOD AND DEVICE OF BATTERY CELL

CROSS-REFERENCE TO RELATED APPLICATIONS

This application is a continuation of International Application No. PCT/CN2021/125110, filed on Oct. 20, 2021, the disclosure of which is hereby incorporated by reference in its entirety.

TECHNICAL FIELD

The present application relates to the field of battery technologies, and in particular, to a battery cell, a battery, a power consumption apparatus, and a manufacturing method and device of a battery cell.

BACKGROUND

In the environment of pursuing energy saving and emission reduction, batteries are widely used in new energy devices, such as electric vehicles. With the continuous development of battery technology, higher requirements are put forward for quality and service life of a battery. However, during the use of the battery, the service life of the battery is short because the battery is in a use environment of shaking and vibrating in a long term.

SUMMARY

The present application aims to provide a battery cell, a battery, a power consumption apparatus, and a manufacturing method and device of a battery cell, so as to prolong service life of a battery.

An embodiment of the present application is implemented as follows.

In a first aspect, an embodiment of the present application provides a battery cell, including: a shell comprising a wall part; an electrode assembly disposed within the shell; and an insulating member disposed between the electrode assembly and the wall part to isolate the wall part from the electrode assembly in an insulating manner; where the insulating member is configured to elastically support the electrode assembly to buffer vibration of the electrode assembly within the shell.

The electrode assembly is disposed within the shell, and the electrode assembly is generally connected to an electrode lead-out part provided on the shell to realize charging and discharging. In the present application, the insulating member is disposed between the electrode assembly and the wall part and configured to isolate the electrode assembly from the wall part in an insulating manner, and the insulating member is configured as an elastic structure to support the electrode assembly. When the electrode assembly vibrates relative to the shell due to shaking or vibrating of the battery cell, the insulating member can buffer the vibration of the electrode assembly, absorb impact of the vibration, and reduce an amplitude of vibration of the electrode assembly, which alleviates the problem that the electrode assembly pulls the electrode lead-out part to avoid the failure of electrical connection of the electrode assembly and the electrode lead-out part, and could also mitigate rigid collision between the electrode assembly and the shell, so as to protect the electrode assembly and prolong the service life of the battery cell.

In an embodiment of the present application, the shell includes a housing and an end cover, the housing has an opening, the end cover covers the opening, and the wall part is the end cover.

In the foregoing technical solution, after the electrode assembly, the insulating member and other components of the battery cell are placed into the housing from the opening of the housing, and the opening is covered by the end cover to close the housing, so as to provide a space for the electrode assembly to perform electrochemical reaction. The insulating member is located between the electrode assembly and the end cover, which could mitigate the rigid collision of the electrode assembly and the end cover, so as to avoid damage to a connecting part between the end cover and the shell, prevent leakage of an electrolytic solution, and thus prolong the service life of the battery cell.

In an embodiment of the present application, the insulating member includes: a body part disposed between the end cover and the electrode assembly to support the electrode assembly, the body part being configured to undergo elastic deformation when the electrode assembly vibrates; and a sealing part provided around the body part, the sealing part being disposed between the end cover and the housing, so that the end cover and the housing are hermetically connected and insulated from each other.

In the foregoing technical solution, the body part is located between the end cover and the electrode assembly, the sealing part is located between the end cover and the housing, and the end cover and the housing clamp the sealing part of the insulating member, which makes, on the one hand, the end cover and the housing be hermetically connected and insulated from each other, and on the other hand, plays the role of fixing the sealing part, so that the insulating member is stably mounted within the shell, which ensures that the body part always supports the electrode assembly, avoids the insulating member being shifted to lose the effects of insulation and vibration buffering, and thus prolongs the service life of the battery cell.

In an embodiment of the present application, a gap exists between the body part and the end cover to allow the body part to be deformed in a direction of the end cover.

In the foregoing technical solution, a gap is provided between the body part and the end cover, the gap enables the electrode assembly and the insulating member to not collide with the end cover when they vibrate within a certain amplitude, thereby further mitigating the rigid collision between the electrode assembly and the end cover, and on the other hand, the gap also enables the end cover to not have a reaction force against the electrode assembly, thereby avoiding the problem that the electrode assembly is damaged by being subject to pressure, and prolonging the service life of the battery cell.

In an embodiment of the present application, the battery cell further includes a pressure relief mechanism, the pressure relief mechanism is disposed on the end cover and configured to be actuated when an internal pressure or temperature of the battery cell reaches a threshold, to relieve the internal pressure, the body part is provided with a path, and the path is configured to communicate an inner portion of the battery cell with the pressure relief mechanism.

In the foregoing technical solution, the path on the body part communicates the inner portion of the battery cell with the pressure relief mechanism, so that the pressure at the pressure relief mechanism is consistent with the internal pressure of the battery cell. When the internal pressure of the battery cell reaches the threshold, the pressure relief mechanism can be actuated under the pressure to relieve the internal pressure of the battery cell, thereby improving safety of the battery cell.

In an embodiment of the present application, the body part includes a supporting part and a connecting part, the supporting part is configured to support the electrode assembly, the connecting part is provided on a periphery of the supporting part and configured to connect the supporting part and the sealing part, and the connecting part is configured to undergo elastic deformation when the electrode assembly vibrates.

In the foregoing technical solution, the body part is configured as the supporting part and the elastic connecting part, the supporting part is not easily deformed and plays a role of stably supporting the electrode assembly; moreover, the connecting part is deformed between the sealing part and the supporting part, and the connecting part does not come into contact with other components such as the electrode assembly and the end cover, so that the connecting part is not easily interfered, which is beneficial to deformation and recovery of the connecting part and improves the effect of buffering the vibration by the insulating member.

In an embodiment of the present application, the supporting part protrudes from the connection part connecting part towards the electrode assembly.

In the foregoing technical solution, the supporting part protrudes in the direction of the electrode assembly, so that a distance between the connecting part and the electrode assembly is increased, so as to alleviate the problem that the connecting part is subjected to interference due to manufacturing tolerances, and ensure the effect of buffering the vibration by the insulating member.

In an embodiment of the present application, the supporting part possesses an annular structure.

In the foregoing technical solution, the supporting part is configured as an annular structure, and the middle part of the annular structure is a through path, which can not only save materials, but also communicate the inner portion of the battery cell with the pressure relief mechanism, increase an exhausting area, and facilitate the rapid relief of the internal pressure of the battery cell.

In an embodiment of the present application, the battery cell further includes a pressure relief mechanism, the pressure relief mechanism is disposed on the end cover and configured to be actuated when an internal pressure or temperature of the battery cell reaches a threshold, to relieve the internal pressure, and a projection of the supporting part on the end cover overlaps the pressure relief mechanism.

In the foregoing technical solution, when the pressure relief mechanism is actuated, emissions may become charged, causing the end cover to become charged, and the end cover and the housing are insulated by the sealing part, which could prevent the end cover and the housing from being short-circuited, so as to avoid greater safety risks. On the other hand, the projection of the supporting part on the end cover overlaps the pressure relief mechanism, that is, the electrode assembly and the pressure relief mechanism are located at two sides of the supporting part, respectively, and since the connecting part is deformed between the sealing part and the supporting part to buffer the vibration of the electrode assembly, an vibration amplitude of vibration of the supporting part and the electrode assembly can be reduced, so as to alleviate the problem that the pressure relief mechanism is damaged due to the impact and prolong the service life of the battery cell.

In an embodiment of the present application, a protrusion is provided on a side of the connecting part toward the end cover, and a projection of the protrusion on the wall part does not overlap the pressure relief mechanism.

In the foregoing technical solution, positions of the protrusion and the pressure relief mechanism are staggered, and when the connecting part is deformed, the protrusion can abut against a position of the end cover where the pressure relief mechanism is not provided to limit the continued deformation of the connecting part, which prevents the electrode assembly from hitting the pressure relief mechanism, avoids the problem that the pressure relief mechanism is damaged due to the hitting by the electrode assembly, and thus prolongs the service life of the battery.

In an embodiment of the present application, the connecting part includes a plurality of connecting arms, the plurality of connecting arms are distributed around the supporting part at intervals, one end of each of the connecting arms is connected to an outer peripheral surface of the supporting part, and the other end thereof is connected to the sealing part.

In the foregoing technical solution, the connecting part is divided into a plurality of connecting arms spaced, and the plurality of connecting arms spaced are more easily to be elastically deformed than the connecting part as a whole, so that the ability of the connecting part to buffer the vibration is improved. The interval between the connecting arms serves as an exhausting path, which increases the exhausting area and is beneficial to rapid relief of the internal pressure of the battery cell.

In an embodiment of the present application, the connecting arm includes a flat straight segment and an inclined segment, the flat straight segment extends from the supporting part in a radial direction of the housing, the inclined segment extends from the flat straight segment in the radial direction of the housing and in a direction away from the electrode assembly, and the inclined segment connects the flat straight segment and the sealing part.

In the foregoing technical solution, the connecting arm is configured to have an inclined segment and a flat straight segment, the flat straight segment connects the inclined segment and the supporting part, and the flat straight segments of the plurality of connecting arms cooperate to prevent the supporting part from being displaced or inclined in the radial direction and ensure that the supporting part stably supports the electrode assembly, and the inclined segment also enables the interval between the supporting part and the end cover to be increased, which further mitigates the rigid collision between the electrode assembly and the end cover and improves the ability of the connecting arm to buffer the vibration.

In an embodiment of the present application, a thickness of the inclined segment gradually decreases in a direction where the sealing part points to the flat straight segment.

In the foregoing technical solution, the thickness of the inclined segment is set to be gradually decreased from the sealing part to the flat straight segment, so that a thickness of a portion of the connecting arm that bears a larger bending moment is larger and a thickness of a portion of the connecting arm that bears a smaller bending moment is smaller, which can not only ensure the bearing capacity of the connecting arm, but also reduce the material cost. On the other hand, a portion of the inclined segment close to the supporting part is relatively easy to be deformed, which can play a better role in buffering the vibration, however a portion of the inclined segment close to the sealing part is relatively not easy to be deformed, which makes the sealing part adjacent to the inclined segment be less susceptible to disturbance and thus also makes the insulating member have both a better buffering effect and a better sealing effect.

In an embodiment of the present application, a reinforcing rib is provided on the outer peripheral surface of the supporting part, the reinforcing rib extends in a peripheral direction of the supporting part, and two ends of the reinforcing rib are respectively connected to two adjacent connecting arms.

In the foregoing technical solution, the reinforcing rib is provided on the outer peripheral surface of the supporting part, and the reinforcing rib is connected to two adjacent connecting arms, so that the structural strength of the supporting part at a position where the connecting arm is not provided is improved to avoid the uneven deformation of the supporting part, which improves the stability of the supporting part, and ensures that the supporting part stably supports the electrode assembly.

In an embodiment of the present application, an end of the housing provided with an opening is inwardly folded to form a folded part, an annular protrusion is provided on an inner wall of the housing, and the annular protrusion extends in a peripheral direction of the housing; and the end cover includes an end cover body and an edge part, the edge part is provided around the end cover body and located between the folded part and the annular protrusion, and the sealing part is configured to cover the edge part.

In the foregoing technical solution, the folded part mates with the annular protrusion to clamp the edge part, and the sealing part covers the edge part, so that the folded part and the annular protrusion squeeze the sealing part respectively to realize insulation and sealing of the end cover and the housing and improve the processing speed and production efficiency.

In an embodiment of the present application, the sealing part includes a first portion, a second portion and a third portion, the first portion is disposed between the annular protrusion and the edge part, the second portion is disposed between the inner wall of the housing and an outer peripheral surface of the edge part, the third portion is disposed between the folded part and the edge part, the second portion connects the first portion and the third portion, and the body part is connected to the first portion.

In the foregoing technical solution, the sealing part is formed by successively connecting the first portion, the second portion and the third portion, so that the edge part is completely wrapped and the insulating effect is good; on the other hand, the three portions of the sealing part are respectively clamped and fixed, and the insulating member is stably mounted and cannot be easily displaced so as to avoid losing the sealing effect and the effect of buffering the vibration, thereby prolonging the service life of the battery cell.

In an embodiment of the present application, the end cover body includes a planar part and a transition part, the transition part is provided on a periphery of the planar part, the transition part extends from the planar part towards the electrode assembly in a radial direction of the housing, and the transition part connects the planar part and the edge part.

In the foregoing technical solution, the end cover body is set to further include a planar part and a transition part, and the planar part is away from the electrode assembly relative to the edge part, and a distance between the planar part and the electrode assembly is increased to avoid the electrode assembly vibrating to hit the end cover, which further mitigates the rigid collision between the electrode assembly and the end cover; and the inner space of the battery cell is also increased, which increases the energy density of the battery cell.

In an embodiment of the present application, in a direction away from the electrode assembly, an outer surface of the planar part is not beyond an outer surface of the folded part.

In the foregoing technical solution, the planar part is not beyond the outer surface of the folded part to avoid damage caused by interference between the planar part and the structure outside the battery cell and protect the end cover, thereby prolonging the service life of the battery cell. On the other hand, the planar part does not occupy the outer space of the battery cell, does not increase the overall volume of the battery cell, and does not reduce the energy density of the battery cell, which ensures that the battery cell has a higher energy density.

In an embodiment of the present application, a first tab is provided at an end of the electrode assembly facing toward the end cover, and the battery cell further includes: a first current collecting member, configured to electrically connect the first tab and the housing, the first current collecting member being disposed between the electrode assembly and the insulating member, and the insulating member abutting against the first current collecting member to elastically support the electrode assembly.

In the foregoing technical solution, the insulating member indirectly supports the electrode assembly through the first current collecting member. When the electrode assembly vibrates, the insulating member can not only buffer the amplitude of vibration of the electrode assembly, but also support the first current collecting member to maintain the amplitude of vibration of the first current collecting member and the electrode assembly relatively consistent, and reduce the pulling force at the connecting part of the first current collecting member and the electrode assembly to avoid the connecting part of the first current collecting member and the electrode assembly being torn, which improves the connection reliability of the first current collecting member and the electrode assembly and prolongs the service life of the battery cell.

In an embodiment of the present application, a second tab is provided at an end of the electrode assembly away from the end cover, and the battery cell further includes: an electrode terminal mounted in the housing in an insulating manner; and a second current collecting member, configured to electrically connect the second tab and the electrode terminal.

In the foregoing technical solution, the second tab is connected to the electrode terminal through the second current collecting member to realize the lead-out and input of electric energy, and the vibration amplitude of vibration of the electrode assembly is reduced under the buffering action of the insulating member, so as to further reduce the pulling force at the connecting part of the second tab and the second current collecting member, and reduce the pulling force at the connecting part of the second current collecting member and the electrode terminal, which improves the connection reliability of the second tab, the second current collecting member and the electrode terminal, ensures stable passing current and prolongs the service life of the battery cell.

In a second aspect, an embodiment of the present application provides a battery including the foregoing battery cell.

In a third aspect, an embodiment of the present application provides a power consumption apparatus including the foregoing battery.

In a fourth aspect, an embodiment of the present application provides a manufacturing method of a battery cell including: providing a shell comprising a wall part; providing an electrode assembly; providing an insulating member; and placing the electrode assembly and the insulating member into the shell, so that the insulating member is located between the electrode assembly and the wall part and elastically supports the electrode assembly, to isolate the wall part from the electrode assembly in an insulating manner and buffer vibration of the electrode assembly within the shell.

In a fifth aspect, an embodiment of the present application provides a manufacturing device of a battery cell including: a first providing apparatus, configured to provide a shell comprising a wall part; a second providing apparatus, configured to provide an electrode assembly; a third providing apparatus, configured to provide an insulating member; and an assembling apparatus, configured to place the electrode assembly and the insulating member into the shell, so that the insulating member is located between the electrode assembly and the wall part and elastically supports the electrode assembly, to isolate the wall part from the electrode assembly in an insulating manner and buffer vibration of the electrode assembly within the shell.

BRIEF DESCRIPTION OF THE DRAWINGS

To describe technical solutions in embodiments of the present application more clearly, the following briefly introduces accompanying drawings required for describing the embodiments. It should be understood that the following accompanying drawings only show some of the embodiments of the present application, and thus should not be regarded as limitation on the scope; and a person of ordinary skill in the art may still derive other drawings from these accompanying drawings without creative efforts.

Figure 1:
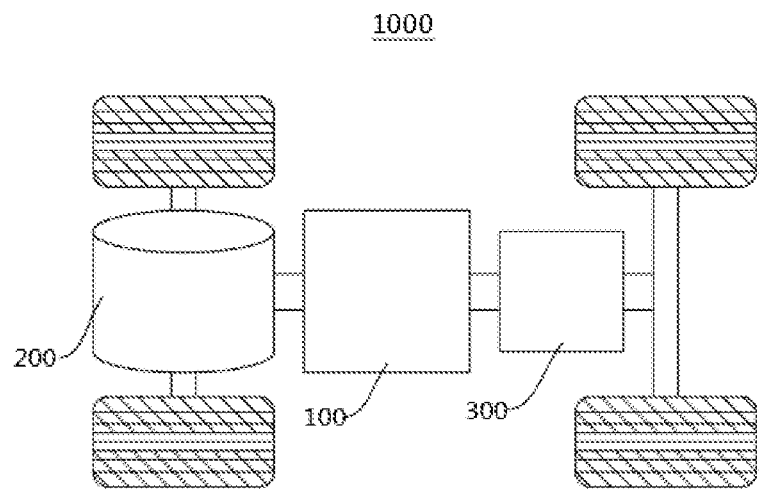
FIG. 1 is a schematic structural diagram of a vehicle provided by an embodiment of the present application.

Reference signs: 1000—vehicle; 100—battery; 101—box; 1011—first box part; 1012—second box part; 1—battery cell; 11—shell; 11a—wall part; 111—housing; 1111—side wall; 11111—folded part; 11112—annular protrusion; 1112—bottom wall; 112—end cover; 1121—end cover body; 11211—planar part; 11212—transition part; 1122—edge part; 12—electrode assembly; 121—main body part; 122—first tab; 123—second tab; 13—insulating member; 131—body part; 1311—supporting part; 13111—annular structure; 13112—second path; 1312—connecting part; 13121—first path; 13122—connecting arm; 131221—protrusion; 131222—flat straight segment; 131223—inclined segment; 1313—reinforcing rib; 132—sealing part; 1321—first portion; 1322—second portion; 1323—third portion; 14—pressure relief mechanism; 141—groove; 15—first current collecting member; 16—electrode terminal; 17—second current collecting member; 200—motor; 300—controller; 400—manufacturing device; 401—first providing apparatus; 402—second providing apparatus; 403—third providing apparatus; 404—assembling apparatus; D—gap; H—height direction of a battery cell.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Unless otherwise defined, all technical and scientific terms used in the present application have the same meanings as those commonly understood by a person skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least one embodiment of the present application. The phrase at various positions in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term "and/or" is only an association relation describing associated objects, which means that there may be three relations. For example, A and/or B may represent three situations: A exists, both A and B exist, and B exists. In addition, the character "/" in the present application generally indicates that the associated objects before and after the character are in an "or" relation.

In the embodiments of the present application, same components are denoted by same reference signs, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, a battery cell may include a lithium-ion secondary battery cell, a lithium-ion primary battery cell, a lithium-sulfur battery cell, a sodium/lithium-ion battery cell, a sodium-ion battery cell or a magnesium-ion battery cell, etc., which is not limited by the embodiments of the present application.

A battery mentioned in the embodiments of the present application refers to a single physical module that includes one or more battery cells to provide a higher voltage and capacity. For example, the battery mentioned in the present application may include a battery module or a battery pack. The battery generally includes a box for enclosing one or more battery cells. The box can prevent liquid or other foreign matters from affecting the charging or discharging of the battery cell.

The battery cell includes an electrode assembly and an electrolyte, and the electrode assembly includes a positive electrode sheet, a negative electrode sheet and an isolating member. The operation of the battery cell mainly relies on movement of metal ions between the positive electrode sheet and the negative electrode sheet. The isolating member is disposed between the positive electrode sheet and the negative electrode sheet to insulate the positive electrode sheet from the negative electrode sheet and avoid a short circuit.

The battery cell further includes a shell configured to accommodate an electrode assembly, an electrolyte, and the like, the shell is further provided with an electrode lead-out part, and the electrode lead-out part is connected to a tab of the electrode assembly so as to realize charging and discharging of the electrode assembly.

At present, in the environment of pursuing energy saving and emission reduction, batteries are widely used, which are applied not only to energy storage power systems such as hydropower, firepower, wind power and solar power plants, but also to electric vehicles such as an electric bicycle, an electric motorcycle, an electric automobile, as well as military devices, aerospace and other fields. With the continuous development of battery technology, higher requirements are put forward for quality and service life of a battery.

The inventors noticed that the service life of a battery is short when the battery is subjected to a use environment of shaking and vibrating in a long term, for example, when the battery is applied to an electric vehicle. It is found that when the battery is in a use environment of shaking or vibrating, the electrode assembly is easily moved inside the battery cell, resulting in the connecting part of the electrode assembly and the electrode lead-out part being pulled or even torn, for example, the tab of the electrode assembly is torn, or the welding portion of the tab and the electrode lead-out part is torn, further resulting in the failure of the electrical connection of the electrode assembly and the electrode lead-out part, and charging and discharging cannot be performed on the battery cell.

In order to alleviate the problem of the short service life of the battery cell caused by the vibration of the electrode assembly, it is considered to reduce the gap between the electrode assembly and the shell to avoid the movement of the electrode assembly within the shell, for example, the size of the electrode assembly is increased so that the electrode assembly is provided in the shell with interference. However, this causes the electrode assembly to be subjected to pressure, the electrode assembly is easily deformed, and the powder thereon falls off (that is, the active substance coated on the electrode sheet falls off) due to the pressure, which causes a lithium precipitation problem and affects the service life of the battery. In addition, if the electrode assembly completely abuts against the shell, the positive electrode and the negative electrode of the electrode assembly are easily conducted through the shell to short-circuit.

Based on the foregoing considerations, in order to solve the problem of short service life of the battery, after intensively studying, the inventor designs a battery cell, where an insulating member is disposed between an electrode assembly and a wall part of a shell, the insulating member is configured to isolate the electrode assembly from the wall part in an insulating manner and elastically support the electrode assembly to buffer vibration of the electrode assembly within the shell.

When the battery cell is in a shaking or vibrating environment and the electrode assembly has a tendency to vibrate relative to the shell, the vibration is transferred to the insulating member, and the insulating member is elastically deformed to buffer the vibration and reduce the amplitude of vibration of the electrode assembly, which alleviates the problem that the connecting part of the electrode assembly and the electrode lead-out part is torn, avoids the failure of the electrical connection of the electrode assembly and the electrode lead-out part, and thus prolongs the service life of the battery cell.

Since the electrode assembly and the wall part of the shell elastically abut by the insulating member, the insulating member can prevent the electrode assembly and the wall part of the shell from contacting and conducting, thereby effectively reducing the risk of a short circuit.

When the electrode assembly moves, it is easy to have a rigid collision with the shell, which leads to the problem that the powder of the electrode assembly falls off (that is, the active substance coated on the electrode sheet falls off); and the insulating member is deformed between the electrode assembly and the wall part, which can also mitigate the rigid collision between the electrode assembly and the shell, thereby protecting the electrode assembly from falling off powder due to the rigid collision, avoiding the problem of lithium precipitation, and prolonging the service life of the battery cell.

In addition, after the electrode assembly is used for a period of time, the tab of the electrode assembly may be further compressed, and the insulating member elastically supported between the electrode assembly and the wall part is deformed to make up for the space generated by the compression of the tab, so that the electrode assembly is maintained in a state of being elastically pressed, which ensures the buffering effect of the insulating member and prolongs the service life of the battery cell.

A battery cell 1 disclosed in an embodiment of the present application may be used in, but not limited to, a power consumption apparatus such as a vehicle 1000, a ship or an aircraft. A power supply system of the power consumption apparatus may be constituted by using the battery cell 1, the battery 100, or the like disclosed in the present application. In this way, it is beneficial to alleviate and automatically adjust the deterioration of the expansion force of the battery cell, supplement the consumed electrolytic solution, and improve the stability of the performance of the battery 100 and the service life of the battery 100.

An embodiment of the present application provides a power consumption apparatus using a battery 100 as a power source, and the power consumption apparatus may be, but not limited to, a vehicle 1000, a cell phone, a portable device, a notebook computer, a ship, a spacecraft, an electric toy, an electric tool, or the like. The vehicle 1000 may be a fuel-powered vehicle, a gas-powered vehicle or a new energy vehicle, and the new energy vehicle may be an electric vehicle, a hybrid vehicle or an extended-range vehicle, etc.; the spacecraft includes airplanes, rockets, space shuttles and spaceships, etc.; the electric toys include fixed or mobile electric toys, such as game consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, impact drills, concrete vibrators, and electric planers. The embodiment of the present application does not make special limitations on the power consumption apparatus.

For the convenience of description, in the following embodiments, the power consumption apparatus being the vehicle 1000 is taken as an example.

As shown in FIG. 1, the figure shows a vehicle 1000 of an embodiment of the present application. The vehicle 1000 may be a fuel-powered vehicle, a gas-powered vehicle or a new-energy vehicle. The new energy vehicle may be an electric vehicle, a hybrid vehicle or an extended-range vehicle, or the like. A battery 100, a controller 300, and a motor 200 may be provided inside the vehicle 1000, and the controller 300 is configured to control the battery 100 to supply power to the motor 200. For example, the battery 100 may be provided at the bottom or head or tail of the vehicle 1000. The battery 100 may be configured to supply power to the vehicle 1000. For example, the battery 100 can be used as an operation power source of the vehicle 1000 and is used for a circuit system of the vehicle 1000, for example, for a working power demand of the vehicle 1000 during startup, navigation and running. In another embodiment of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
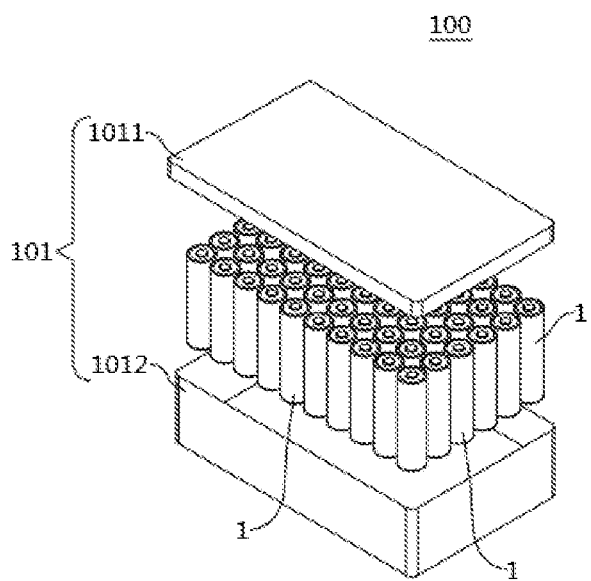
FIG. 2 is an exploded view of a battery provided by an embodiment of the present application.

In order to meet different power demands, as shown in FIG. 2, the battery 100 may include a plurality of battery cells 1, where the plurality of battery cells 1 may be in series connection, parallel connection or series-parallel connection. The series-parallel connection refers to a combination of series connection and parallel connection. The battery 100 may also be referred to as a battery pack. Optionally, the plurality of battery cells 1 may be first connected in series, in parallel or in series and parallel to form a battery module, and then a plurality of battery modules are connected in series, in parallel or in series and parallel to form the battery 100. That is, the plurality of battery cells 1 may directly form the battery 100, or may first form the battery modules and then the battery modules form the battery 100.

The battery 100 may further include a box 101 (or referred to as a covering) with the inner portion thereof being a hollow structure, and the plurality of battery cells 1 are accommodated in the box 101. The box 101 may include two portions for accommodation, which are respectively referred to as a first box part 1011 and a second box part 1012, and the first box part 1011 and the second box part 1012 are fastened together. The shapes of the first box part 1011 and the second box part 1012 may be determined according to the shape of the combined plurality of battery cells 1, and the first box part 1011 and the second box part 1012 may each have an opening. For example, the first box part 1011 and the second box part 1012 each may be a hollow rectangular parallelepiped with only one surface of each being an opening surface, and the opening of the first box part 1011 is disposed opposite to the opening of the second box part 1012. The first box part 1011 and the second box part 1012 are fastened to each other to form a box 101 with a closed chamber. One of the first box part 1011 and the second box part 1012 may be a rectangular parallelepiped with an opening, and the other one may be a cover plate structure to close the opening of the rectangular parallelepiped. The plurality of battery cells 1 are combined in parallel connection or series connection or series-parallel connection and are then placed in the box 101 formed by fastening the first box part 1011 to the second box part 1012.

Optionally, the battery 100 may also include other structures. For example, the battery 100 may also include a bus component (not shown). The bus component is configured to implement the electrical connection between the plurality of battery cells 1, such as parallel connection, series connection or series-parallel connection. Specifically, the bus component may implement electrical connections between the battery cells 1 by connecting the electrode lead-out parts of the battery cells 1. Further, the bus component may be fixed to the electrode lead-out part of the battery cell 1 through welding. Electric energy of the plurality of battery cells 1 may be further led out through an electrically conductive mechanism passing through the box 101. Optionally, the electrically conductive mechanism may also belong to the bus component.

Figure 3:
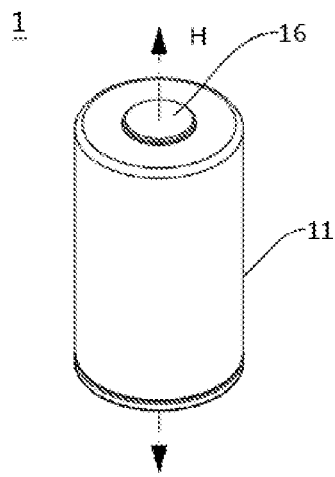
FIG. 3 is a perspective view of a battery cell provided by an embodiment of the present application.
Figure 4:
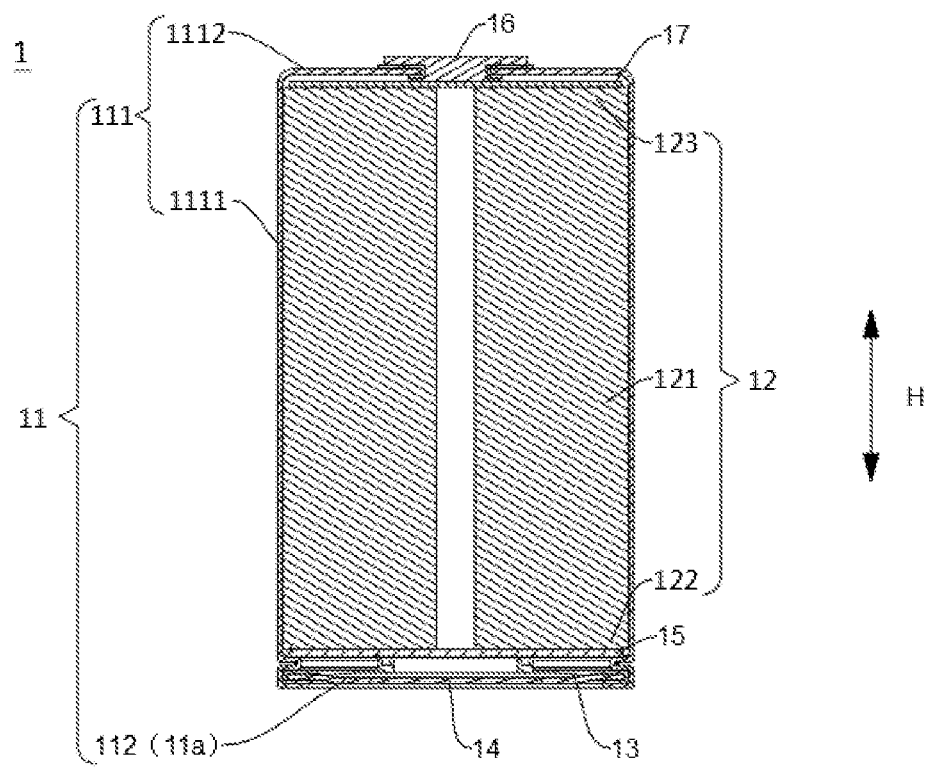
FIG. 4 is a sectional view of a battery cell provided by an embodiment of the present application.

Hereinafter, any one of the battery cells 1 will be described in detail. As shown in FIG. 3 and FIG. 4, the battery cell 1 includes a shell 11, an electrode assembly 12 and an insulating member 13. The shell 11 includes a wall part 11a, the electrode assembly 12 is disposed within the shell 11, and the insulating member 13 is disposed between the electrode assembly 12 and the wall part 11a to isolate the wall part 11a from the electrode assembly 12 in an insulating manner. The insulating member 13 is configured to elastically support the electrode assembly 12 to buffer vibration of the electrode assembly 12 within the shell 11.

It should be noted that the insulating member 13 may directly support the electrode assembly 12 or indirectly support the electrode assembly 12, that is, there may be other functional components between the electrode assembly 12 and the insulating member 13.

The electrode assembly 12 includes a positive electrode sheet, a negative electrode sheet and an isolating member. The operation of the battery cell 1 mainly relies on movement of metal ions between the positive electrode sheet and the negative electrode sheet. The positive electrode sheet includes a positive electrode current collector and a positive active substance layer, the positive active substance layer is coated on a surface of the positive electrode current collector; the positive electrode current collector includes a positive electrode current collector coated with a positive active substance layer and a positive electrode tab uncoated with a positive active substance layer. Taking a lithium-ion battery as an example, the material of the positive electrode current collector may be aluminum, the positive active substance layer includes a positive active substance, and the positive active substance may be lithium cobalt oxides, lithium iron phosphate, ternary lithium or lithium manganate, or the like. The negative electrode sheet includes a negative electrode current collector and a negative active substance layer, and the negative active substance layer is coated on a surface of the negative electrode current collector; the negative electrode current collector includes a negative electrode current collector coated with a negative active substance layer and a negative electrode tab uncoated with a negative active substance layer. A material of the negative electrode current collector may be copper, the negative active substance layer includes a negative active substance, and a negative electrode active substance may be carbon, silicon, or the like. A material of the isolating member may be polypropylene (polypropylene, PP) or polyethylene (polyethylene, PE), etc.

The insulating member 13 is an elastic member made of an insulating material, for example, an elastic pad made of a rubber material or a plastic material; an elastic structure made of a rubber material or a plastic material; and an elastic structure made of a high damping alloy, whose outer portion is coated with a rubber material or a plastic material.

Optionally, the shell 11 may also be configured to contain an electrolyte, such as an electrolytic solution. Optionally, the material of the shell 11 may be various, such as copper, iron, aluminum, steel, aluminum alloy, etc., and the embodiment of the present application is not particularly limited thereto. The shell 11 has a hollow structure, and a space for accommodating the electrode assembly 12 is provided inside the shell 11. The shape of the shell 11 may be determined according to a specific shape of the electrode assembly 12. For example, if the electrode assembly 12 has a cylindrical structure, the shell 11 may be selected as a cylindrical housing; and if the electrode assembly 12 has a rectangular parallelepiped structure, the shell 11 may be a rectangular parallelepiped housing. Optionally, the electrode assembly 12 and the shell 11 are each a cylinder, a height direction H of the battery cell is an axial direction of the cylinder, and the wall part 11a is an end wall of one end of the shell 11 in the height direction H of the battery cell.

As shown in FIG. 4, the insulating member 13 is supported between the wall part 11a and the electrode assembly 12. When the electrode assembly 12 is relatively close to or away from the wall part 11a, the insulating member 13 is elastically deformed. When the electrode assembly 12 vibrates relative to the shell 11 due to shaking or vibrating of the battery cell 1, the insulating member 13 at least buffers the vibration of the electrode assembly 12 in the height direction H of the battery cell, and reduces the amplitude of vibration of the electrode assembly 12, which alleviates the problem that the connecting part of the electrode assembly 12 and the electrode lead-out part is pulled to avoid the failure of the electrical connection between the electrode assembly 12 and the electrode lead-out part, and could also mitigate the rigid collision between the electrode assembly 12 and the shell 11 and prevent the short circuit due to overlapping of the electrode assembly 12 and the wall part 11a of the shell 11, so as to protect the electrode assembly 12 and thus prolong the service life of the battery cell 1.

When the tab of the electrode assembly 12 is further compressed in use, the insulating member 13 can also make up for the space generated by the compression of the tab, so that the electrode assembly 12 is maintained in a state of being elastically pressed, which ensures the buffering effect of the insulating member 13 and prolongs the service life of the battery cell 1.

Figure 5:
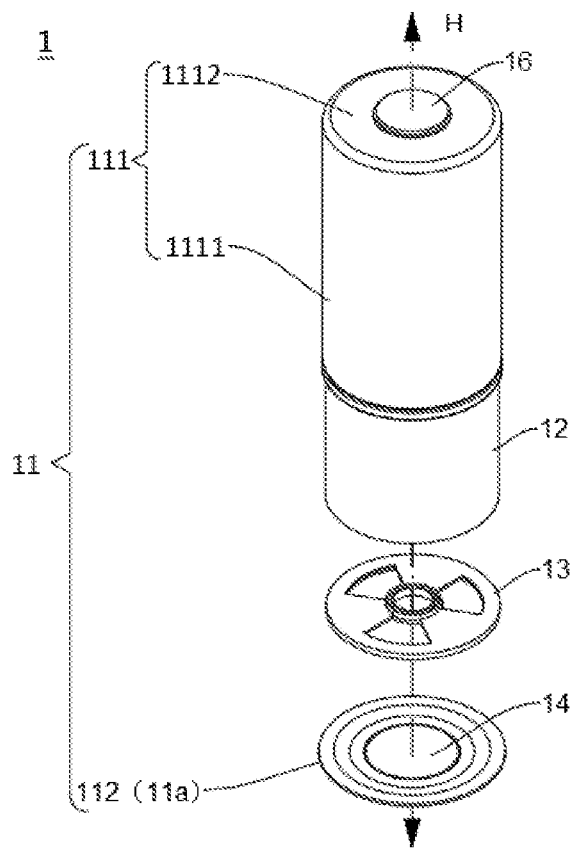
FIG. 5 is an exploded view of a battery cell provided in an embodiment of the present application.

According to some embodiments of the present application, optionally, in combination with FIG. 4 and FIG. 5, the shell 11 includes a housing 111 having an opening (not shown), and an end cover 112 covering the opening, and the foregoing wall part 11a is the end cover 112.

The housing 111 is a component for accommodating functional components such as the electrode assembly 12, and the electrolyte. The housing 111 may have various shapes and various sizes, such as a rectangular parallelepiped shape, a cylindrical shape, and a hexagonal prism shape. Optionally, when the shell 11 is a cylinder, the housing 111 is a portion of the cylinder. The housing 111 includes a side wall 1111 and a bottom wall 1112. The side wall 1111 is enclosed, the bottom wall 1112 closes one end of the side wall 1111, and the other end of the side wall 1111 forms an opening opposite to the bottom wall 1112.

The end cover 112 refers to a component that covers the opening of the housing 111 to isolate the internal environment of the battery cell 1 from the external environment. Without limitation, the shape of the end cover 112 may be adapted to the shape of the housing 111 to fit the housing 111. Optionally, when the shell 11 is a cylinder, the end cover 112 is another portion of the cylinder. Optionally, the end cover 112 may be made of a material with certain hardness and strength (such as aluminum alloy), and in this way, the end cover 112 is not easily deformed when it is squeezed and collided, so that the battery cell 1 can have higher structural strength and the safety performance can also be improved.

The housing 111 and the end cover 112 may be separate components, and an opening may be provided on the housing 111, and the end cover 112 covers the opening to form the internal environment of the battery cell 1. Without limitation, the end cover 112 and the housing 111 may be integrated. Specifically, the end cover 112 and the housing 111 may form a common connecting surface before other components being placed into the housing, and when it is necessary to package the inner portion of the housing 111, the end cover 112 covers the housing 111.

The structural strength of the connecting part of the end cover 112 and the housing 111 is relatively low, the insulating member 13 is located between the electrode assembly 12 and the end cover 112, and the rigid collision of the electrode assembly 12 and the end cover 112 is prevented, to avoid liquid leakage caused by damaging the connecting part of the end cover 112 and the shell 11, and prolong the service life of the battery cell 1.

Since the insulating member 13 isolates the electrode assembly 12 and the end cover 112 in an insulating manner, the end cover 112 can be uncharged, which reduces the risk of short circuit caused by the end cover 112 being charged.

Figure 6:
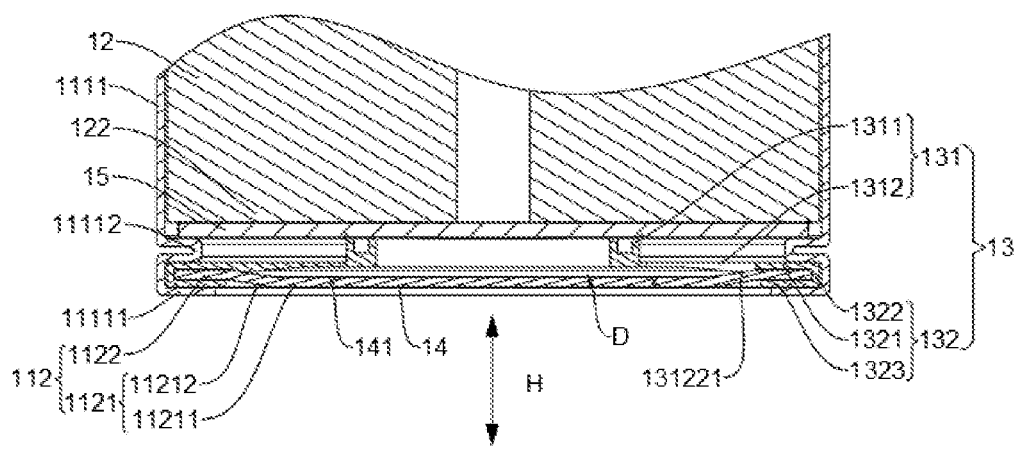
FIG. 6 is a partial enlarged view of FIG. 4.

According to some embodiments of the present application, optionally, as shown in FIG. 6, the insulating member 13 includes a body part 131 and a sealing part 132. The body part 131 is disposed between the end cover 112 and the electrode assembly 12 to support the electrode assembly 12 and configured to undergo elastic deformation when the electrode assembly 12 vibrates. The sealing part 132 is provided around the body part 131 and the sealing part 132 is disposed between the end cover 112 and the housing 111, so that the end cover 112 and the housing 111 are hermetically connected and insulated from each other.

The body part 131 of the insulating member 13 serves as an elastic structure and is disposed between the end cover 112 and the electrode assembly 12 to isolate the end cover 112 from the electrode assembly 12 in an insulating manner; when the electrode assembly 12 vibrates relative to the shell 11, the body part 131 is elastically deformed to buffer the vibration and reduce the amplitude of vibration of the electrode assembly 12, which alleviates the problem that the electrode assembly 12 and the electrode lead-out part are pulled to avoid the failure of the electrical connection between the electrode assembly 12 and the electrode lead-out part, and also mitigates the rigid collision among the electrode assembly 12 and the end cover 112 and the bottom wall 1112 and prevents the short circuit due to overlapping of the electrode assembly 12 and the end cover 112, so as to prolong the service life of the battery cell 1.

The sealing part 132 of the insulating member 13 serves as an insulating sealing structure and is disposed between the end cover 112 and the housing 111 to isolate the end cover 112 from the housing 111 in an insulating manner so as to reduce the risk of short circuit; and meanwhile, the end cover 112 mates with the housing 111 to compress the sealing part 132 so as to realize sealing connection, thereby reducing the risk of liquid leakage at the connection position of the end cover 112 and the housing 111, and thus prolonging the service life of the battery cell 1. On the other hand, the sealing part 132 is compressed by the cooperation of the end cover 112 and the housing 111, which also plays a role in fixing the sealing part 132, so that the insulating member 13 is stably mounted in the shell 11 so as to prevent the insulating member 13 from being displaced, ensure that the body part 131 supports the electrode assembly 12 to have the effect of insulation and vibration buffering, and further prolong the service life of the battery cell 1.

According to some embodiments of the present application, optionally, as shown in FIG. 6, the body part 131 and the end cover 112 have a gap D therebetween to allow the body part 131 to be deformed in a direction of the end cover 112.

The body part 131 and the end cover 112 having a gap D therebetween means that the body part 131 is not in contact with the end cover 112, or that the body part 131 is not in full contact with the end cover 112, that is, the body part 131 is at least partially out of contact with the end cover 112.

The gap D is provided between the body part 131 and the end cover 112, the gap D enables the electrode assembly 12 and the insulating member 13 to not collide with the end cover 112 when they vibrate within a certain amplitude, thereby further mitigating the rigid collision between the electrode assembly 12 and the end cover 112, and on the other hand, the gap also enables the end cover 112 to not have a reaction force against the electrode assembly 12, thereby avoiding the problem that the electrode assembly is damaged by being subject to pressure, and prolonging the service life of the battery cell 1.

According to some embodiments of the present application, optionally, as shown in FIG. 5 and FIG. 6, the battery cell 1 further includes a pressure relief mechanism 14, the pressure relief mechanism 14 is disposed on the end cover 112 and configured to be actuated when an internal pressure or temperature of the battery cell 1 reaches a threshold, to relieve the internal pressure, and the body part 131 is provided with a path, and the path is configured to communicate an inner portion of the battery cell 1 with the pressure relief mechanism 14.

The pressure relief mechanism 14 refers to an element or component that is actuated when an internal pressure or temperature of the battery cell 1 reaches a predetermined threshold, to relieve the internal pressure or heat. The design of the threshold varies according to different design requirements. The threshold may depend on the material of one or more of the positive electrode sheet, the negative electrode sheet, the electrolytic solution and the separator in the battery cell 1.

The "actuation" mentioned in the present application means that the pressure relief mechanism 14 acts or is activated to a certain state, such that the internal pressure and heat of the battery cell 1 can be relieved. The action generated by the pressure relief mechanism 14 may include but be not limited to: at least a part of the pressure relief mechanism 14 is cracked, broken, torn or opened, and so on. When the pressure relief mechanism 14 is actuated, high-temperature and high-pressure substances inside the battery cell 1 are discharged outwards from the actuated portion as emissions. In this way, the pressure in the battery cell 1 can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the separator, high-temperature and high-pressure gas generated by reaction, flame, etc.

The pressure relief mechanism 14 on the battery cell 1 has an important impact on the safety of the battery 100. For example, when short circuit, overcharge and other phenomena occur, it may lead to thermal runaway inside the battery cell 1, resulting in a sudden increase in pressure or temperature. In this case, the internal pressure and heat can be released outward through the actuation of the pressure relief mechanism 14, to prevent the battery cell from exploding and catching fire.

The pressure relief mechanism 14 may take the form of an anti-explosion valve, an air valve, a pressure relief valve or a safety valve, etc., and may specifically adopt a pressure-sensitive or temperature-sensitive element or structure. That is, when the internal pressure or temperature of the battery cell 1 reaches a predetermined threshold, the pressure relief mechanism 14 performs an action or a weakened structure provided in the pressure relief mechanism 14 is damaged, so as to form a through opening or path for relieving the internal pressure or heat. The pressure relief mechanism 14 may also be integrally provided on the end cover 112, for example, a local thickness of the end cover 112 is reduced to form a weakened region, and the weakened region is used as the pressure relief mechanism 14. Exemplarily, in combination with FIG. 6 and FIG. 10, a groove 141 is disposed on the end cover 112 so as to thin a thickness of the end cover 112, and a region enclosed by the groove 141 serves as the pressure relief mechanism 14; and when the internal pressure or temperature of the battery cell 1 reaches a threshold, the end cover 112 cracks along the groove 141, so that the pressure relief mechanism 14 is disengaged from the end cover 112, thereby forming a through opening on the end cover 112 for relief. Optionally, surfaces of both sides of the end cover 112 are provided with the groove 141, and the positions of the grooves 141 on both sides corresponds to each other. Optionally, the groove 141 may not be enclosed by 360 degrees, so that the pressure relief mechanism 14 is partially connected to the end cover 112; and when the internal pressure or temperature of the battery cell 1 reaches a threshold, the end cover 112 cracks along the groove 141, so that a portion of the pressure relief mechanism 14 is disengaged from the end cover 112, thereby forming a through opening on the end cover 112 for pressure relief, and another portion of the pressure relief mechanism 14 is connected to the end cover 112, so that the pressure relief mechanism 14 does not fly under the impact of emissions to avoid a safety hazard.

The inner portion of the battery cell 1 refers to a space formed between the end cover 112 and the inner wall of the housing 111 for accommodating the electrode assembly 12 after the end cover 112 covers the opening of the housing 111, and in the present application, it is a space formed by the insulating member 13 enclosing the housing 111 for accommodating the electrode assembly 12.

Figure 7:
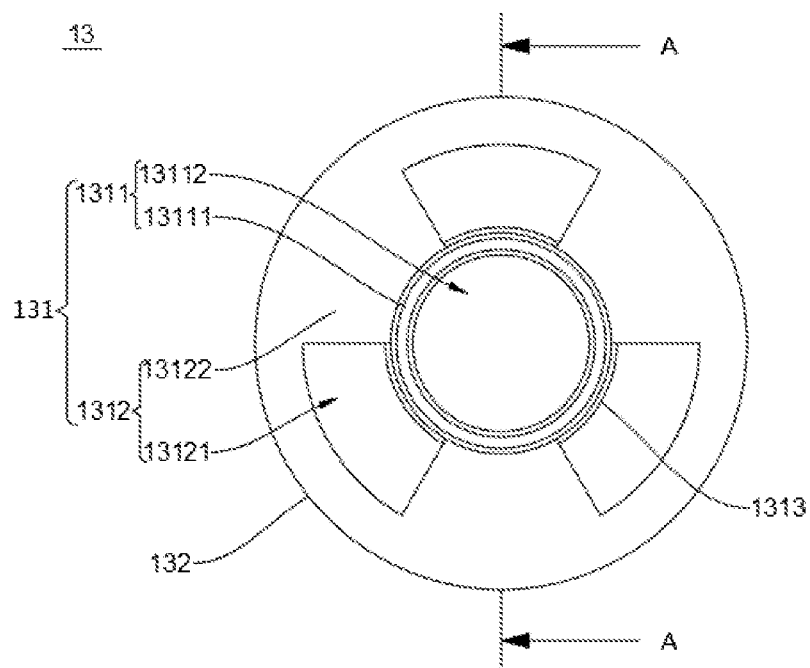
FIG. 7 is a plan view of an insulating member provided by an embodiment of the present application.

As shown in FIG. 7, a path on the body part 131 includes a first path 13121 and a second path 13112, the second path 13112 is located at a central region of the body part 131, and the first path 13121 is located outside the central region of the body part 131. Optionally, a first path 13121 or a second path 13112 may be provided on the body part 131, or both the first path 13121 and the second path 13112 may be simultaneously provided thereon.

A path on the body part 131 is configured to communicate the inner portion of the battery cell 1 with the pressure relief mechanism 14, so that the pressure of the pressure relief mechanism 14 is consistent with the pressure inside the battery cell 1, and when the pressure inside the battery cell 1 reaches a threshold, it is ensured that the pressure relief mechanism 14 can be actuated under pressure, and the emissions inside the battery cell 1 can reach the pressure relief mechanism 14 via the path so as to be discharged through the pressure relief mechanism 14, thereby reducing the pressure inside the battery cell 1 and improving the safety of the battery cell 1.

When the pressure relief mechanism 14 is actuated, emissions may become charged, causing the end cover 112 to become charged, and the end cover 112 and the housing 111 are insulated by the sealing part 132, which could prevent the end cover 112 and the housing 111 from being short-circuited, so as to avoid greater safety risks.

According to some embodiments of the present application, optionally, as shown in FIG. 6, the body part 131 includes a supporting part 1311 and a connecting part 1312, the supporting part 1311 is configured to support the electrode assembly 12, the connecting part 1312 is provided on a periphery of the supporting part 1311, and configured to connect the supporting part 1311 and the sealing part 132, and the connecting part 1312 is configured to undergo elastic deformation when the electrode assembly 12 vibrates.

The supporting part 1311 is a portion of the body part 131 that is relatively not easy to be deformed, and the supporting part 1311 always abuts against one end of the electrode assembly 12 so as to play the role of stably supporting the electrode assembly 12. The supporting part 1311 may directly abut against one end of the electrode assembly 12; and the supporting part 1311 may indirectly abut against one end of the electrode assembly 12 through another functional components.

The connecting part 1312 is a portion of the body part 131 that is relatively easy to be deformed, and the vibration is mainly buffered by elastic deformation of the connecting part 1312.

Since the sealing part 132 is fixed, the position of the supporting part 1311 is relatively stable, the connecting part 1312 is connected between the sealing part 132 and the supporting part 1311 and deformed between the sealing part 132 and the supporting part 1311, and the connecting part 1312 does not come into contact with other components such as the electrode assembly 12 and the end cover 112, so that the connecting part 1312 is not easily interfered, which is beneficial to deformation and recovery of the connecting part 1312 and improves the effect of buffering the vibration by the insulating member 13.

According to some embodiments of the present application, optionally, as shown in FIG. 6, the supporting part 1311 protrudes from the connecting part 1312 in a direction of the electrode assembly 12.

The supporting part 1311 protruding from the connecting part 1312 in the direction of the electrode assembly 12 refers to that in the height direction H of the battery cell, the side of the supporting part 1311 close to the electrode assembly 12 is beyond the side of the connecting part 1312 close to the electrode assembly 12.

Since the supporting part 1311 protrudes in the direction of the electrode assembly 12, a distance between the connecting part 1312 and the electrode assembly 12 is increased, so as to avoid the problem that the connecting part 1312 comes into contact with the electrode assembly 12 due to manufacturing tolerances (or comes into contact with other functional components disposed at the end part of the electrode assembly 12), and further prevent the connecting part 1312 from being interfered.

According to some embodiments of the present application, optionally, as shown in FIG. 7, the supporting part 1311 possesses an annular structure 13111.

The supporting part 1311 having an annular structure 13111 means that the middle part of the supporting part 1311 forms a through path. The supporting part 1311 is configured as the annular structure 13111, which can not only save materials, but also communicate the inner portion of the battery cell 1 with the pressure relief mechanism 14, increase an exhausting area, and facilitate the rapid relief of the internal pressure of the battery cell 1. Optionally, the through path formed at the middle part of the annular structure 13111 may be the second path 13112.

According to some embodiments of the present application, optionally, as shown in FIG. 5 and FIG. 6, the battery cell 1 further includes a pressure relief mechanism 14, the pressure relief mechanism 14 is disposed on the end cover 112 and configured to be actuated when an internal pressure or temperature of the battery cell 1 reaches a threshold, to relieve the internal pressure, and a projection of the supporting part 1311 on the end cover 112 overlaps the pressure release mechanism 14.

In the height direction H of the battery cell, the position of the supporting part 1311 corresponds to the position of the pressure relief mechanism 14, and the electrode assembly 12 and the pressure relief mechanism 14 are respectively located on two sides of the supporting part 1311. Since the connecting part 1312 is deformed between the sealing part 132 and the supporting part 1311, an vibration amplitude of vibration of the supporting part 1311 and the electrode assembly 12 can be reduced, so as to alleviate the problem that the pressure relief mechanism 14 is damaged due to the impact and prolong the service life of the battery cell 1.

Figure 8:
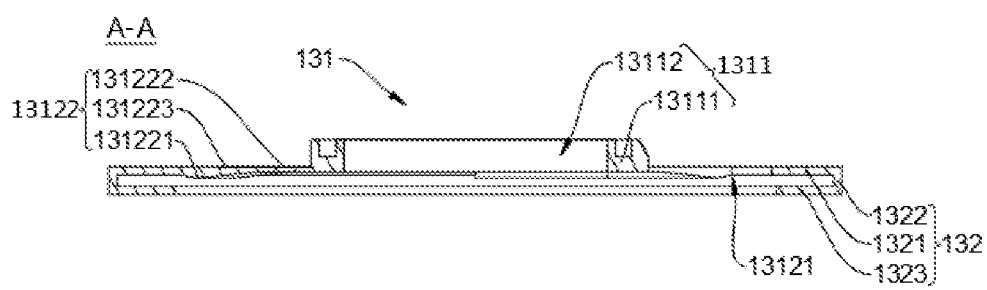
FIG. 8 is a sectional view of an insulating member provided by an embodiment of the present application.

According to some embodiments of the present application, optionally, in combination with FIG. 6 and FIG. 8, a protrusion 131221 is provided on a side of the connecting part 1312 toward the end cover 112, and a projection of the protrusion 131221 on the wall part 11*a* does not overlap the pressure relief mechanism 14.

The protrusion 131221 is located on the side of the connecting part 1312 toward the end cover 112 (that is, the wall part 11*a*), and positions of the protrusion 131221 and the pressure relief mechanism 14 are staggered, and when the connecting part 1312 is deformed, the protrusion 131221 can abut against the end cover 112 to limit the continuous deformation of the connecting part 1312, which prevents the electrode assembly 12 from beating the pressure relief mechanism 14, avoids the problem that the pressure relief mechanism 14 is damaged due to the hitting by the electrode assembly 12, and thus prolongs the service life of the battery 100.

According to some embodiments of the present application, optionally, in combination with FIG. 7 and FIG. 8, the connecting part 1312 includes a plurality of connecting arms 13122, the plurality of connecting arms 13122 are distributed around the supporting part 1311 at intervals, one end of each of the connecting arm 13122 is connected to an outer peripheral surface of the supporting part 1311, and the other end thereof is connected to the sealing part 132.

As shown in FIG. 7, the connecting part 1312 is divided into a plurality of connecting arms 13122 at intervals. "A plurality of" in the present application means two or more than two, such as three.

The connecting part 1312 is divided into a plurality of spaced connecting arms 13122, and the plurality of connecting arms 13122 spaced are more easily to be elastically deformed than the connecting part 1312 as a whole, so that the ability of the connecting part 1312 to buffer vibration is improved. On the other hand, the plurality of connecting arms 13122 are spaced in a peripheral direction of the supporting part 1311, that is, the plurality of connecting arms 13122 collectively provide the supporting part 1311 with in the peripheral direction of the supporting part 1311a supporting force that is in a radial direction, so that the supporting part 1311 is force-balanced in the radial direction, to make the supporting part 1311 stable and make it not easily be displaced in the radial direction relative to the electrode assembly 12. The radial direction herein means a direction perpendicular to the height direction H of the battery cell.

Optionally, the spaced portion of the connecting arm 13122 may serve as the first path 13121, which plays a role in increasing the exhausting area and is beneficial to rapid relief of the internal pressure of the battery cell 1.

According to some embodiments of the present application, optionally, as shown in FIG. 8, the connecting arm 13122 includes a flat straight segment 131222 and an inclined segment 131223, the flat straight segment 131222 extends from the supporting part 1311 in a radial direction of the housing 111, the inclined segment 131223 extends from the flat straight segment 131222 in the radial direction of the housing 111 and in a direction away from the electrode assembly 12, and the inclined segment 131223 connects the flat straight segment 131222 and the sealing part 132.

The connecting arm 13122 is configured to have an inclined segment 131223 and a flat straight segment 131222, the flat straight segment 131222 connects the inclined segment 131223 and the supporting part 1311, the flat straight segments 131222 of the plurality of connecting arms 13122 cooperate to prevent the supporting part 1311 from being displaced or inclined in the radial direction and ensure that the supporting part 1311 stably supports the electrode assembly 12.

On the other hand, the sealing part 132 is relatively close to the end cover 112, the supporting part 1311 and the flat straight segment 131222 are relatively close to the electrode assembly 12, and the inclined segment 131223 is located between the flat straight segment 131222 and the sealing part 132 to play a transition role, and enables the interval between the supporting part 1311 and the end cover 112 to be increased, which further mitigates the rigid collision between the electrode assembly 12 and the end cover 112 and improves the ability of the connecting arm 13122 to buffer the vibration.

In addition, when the tab is further compressed in use, the deformation of the inclined segment 131223 can make up for the space generated by the compression of the tab, so that the electrode assembly 12 is maintained in a state of being elastically pressed, which ensures the buffering effect of the insulating member 13 and prolongs the service life of the battery cell 1.

According to some embodiments of the present application, optionally, as shown in FIG. 8, a thickness of the inclined segment 131223 decreases gradually in a direction where the sealing part 132 points to the flat straight segment 131222.

As shown in FIG. 8, the connecting arm 13122 may be regarded as a hanging arm structure with one end being fixed to the sealing part 132. The electrode assembly 12 acts on the end of the connecting arm 13122 away from the sealing part 132 through the supporting part 1311, in other words, the end of the connecting arm 13122 away from the sealing part 132 is subjected to a concentrated load. In this case, the force analysis of the connecting arm 13122 shows that the closer to the connecting part of the connecting arm 13122 and the sealing part 132 is, the greater the bending moment of the connecting arm 13122 is. By setting a thickness of the inclined segment 131223 to be larger at a portion close to the sealing part 132 and smaller at a portion away from the sealing part 132, a thickness of a portion of the connecting arm 13122 that bears a larger bending moment is larger, and a thickness of a portion of the connecting arm 13122 that bears a smaller bending moment is smaller, which can not only ensure the bearing capacity of the connecting arm 13122, but also reduce the material cost.

However, according to experience, it is known that a portion of an object having a smaller thickness is easily deformed than a portion thereof having a larger thickness, and in the foregoing technical solution, a portion of the inclined segment 131223 close to the supporting part 1311 is relatively easy to be deformed, so that a better vibration buffering effect can be achieved; and a portion of the inclined segment 131223 close to the sealing part 132 is relatively not easy to be deformed, which makes the sealing part 132 adjacent to the inclined segment 131223 be less susceptible to disturbance. Therefore, the thickness of the inclined segment 131223 is set to be gradually decreased from the sealing part 132 to the flat straight segment 131222, which makes the insulating member 13 have both a better buffering effect and a better sealing effect.

Figure 9:
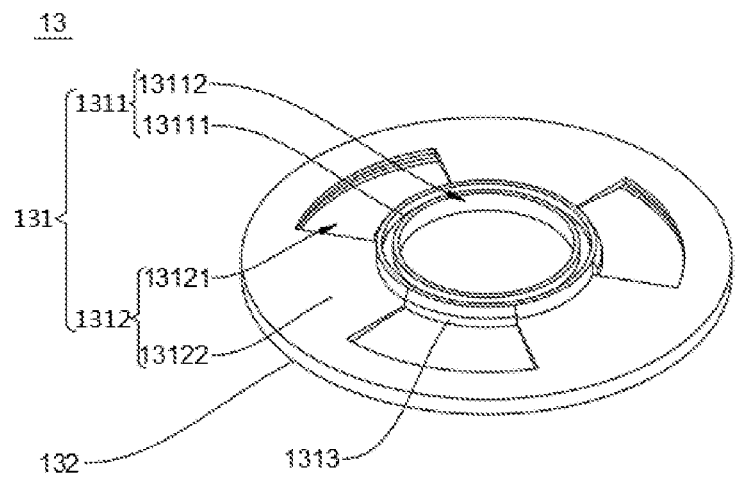
FIG. 9 is a perspective view of an insulating member provided by an embodiment of the present application.

According to some embodiments of the present application, optionally, as shown in FIG. 9, a reinforcing rib 1313 is provided with an outer peripheral surface of the supporting part 1311, the reinforcing rib 1313 extends in a peripheral direction of the supporting part 1311, and two ends of the reinforcing rib 1313 are respectively connected to two adjacent connecting arms 13122.

As shown in FIG. 9, the connecting arm 13122 is connected to the outer peripheral surface of the supporting part 1311, and due to the action of the connecting arm 13122, the structural strength of the portion of the supporting part 1311 to which the connecting arm 13122 is connected is relatively high, and the structural strength of the portion (that is, the portion between two adjacent connecting arms 13122) of the supporting part 1311 to which the connecting arm 13122 is not connected is relatively low, which causes the supporting part 1311 to easily generate uneven deformation.

The reinforcing rib 1313 is configured to be connected to a surface of the component to increase the rigidity and structural strength of the component. The reinforcing rib 1313 may be formed integrally with the supporting part 1311 or may be formed separately and connected to the supporting part 1311.

In the foregoing technical solution, the reinforcing rib 1313 is connected to a portion of the supporting part 1311 with which the connecting arm 13122 is not provided, to increase the structural strength of the portion of the supporting part 1311 with which the connecting arm 13122 is not provided, thereby alleviating the problem of uneven deformation of the supporting part 1311. Furthermore, the reinforcing rib 1313 extends in the peripheral direction of the supporting part 1311, so that two ends of the reinforcing ribs 1313 are respectively connected to two adjacent connecting arms 13122, the force on the portion of the supporting part 1311 with which the connecting arm 13122 is not provided can also be transferred to the connecting arms 13122, and the entire periphery of the supporting part 1311 is supported by the connecting arm 13122, thereby further alleviating the problem of uneven deformation of the supporting part 1311.

The problem of uneven deformation of the supporting part 1311 is alleviated, and the stability of the supporting part 1311 is improved to ensure that the supporting part 1311 stably supports the electrode assembly 12.

Figure 10:
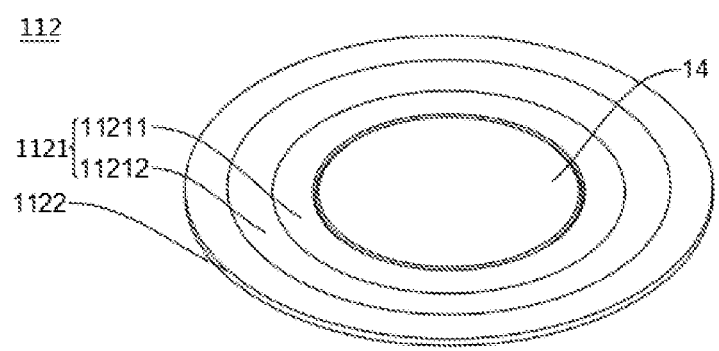
FIG. 10 is a perspective view of an end cover provided by an embodiment of the present application.

According to some embodiments of the present application, optionally, as shown in FIG. 6 and FIG. 10, an end of the housing 111 provided with an opening is inwardly folded to form a folded part 11111, an annular protrusion 11112 is provided on an inner wall of the housing 111, and the annular protrusion 11112 extends in a periphery of the housing 111; and the end cover 112 includes an end cover body 1121 and an edge part 1122, the edge part 1122 is provided around the end cover body 1121 and located between the folded part 11111 and the annular protrusion 11112, and the sealing part 132 is configured to cover the edge part 1122.

The end of the housing 111 provided with the opening refers to an end of the side wall 1111 that is away from the bottom wall 1112, in other words, an end of the side wall 1111 that mates with the end cover 112.

The folded part 11111 refers to a portion perpendicular to a direction of a central axis of the battery cell 1 formed by folding an edge of the side wall 1111 in a direction close to the central axis of the battery cell 1. In the present application, the direction of the central axis of the battery cell 1 is the height direction H of the battery cell. The folded part 11111 may be partially or entirely perpendicular to the direction of the central axis of the battery cell 1. In the present application, "perpendicular to" does not mean that it is absolutely perpendicular to the component, but may be slightly inclined, for example, the folded part 11111 may have a certain angle with respect to the height direction H of the battery cell.

The annular protrusion 11112 refers to a convex structure provided on the side wall 1111 in the peripheral direction of the housing 111. Optionally, roller groove processing is performed on the housing 111 from the outer side of the housing 111, so as to form an annular protrusion 11112 toward the inner side of the housing 111 at the portion corresponding to the roller groove of the housing 111.

The folded part 11111 mates with the annular protrusion 11112 to clamp the edge part 1122, and the sealing part 132 covers the edge part 1122, so that the folded part 11111 and the annular protrusion 11112 squeeze the sealing part 132 respectively to realize insulation and sealing of the end cover 112 and the housing 111 and improve the processing speed and production efficiency.

According to some embodiments of the present application, optionally, as shown in FIG. 6, the sealing part 132 includes a first portion, a second portion 1322, and a third portion 1323, the first portion 1321 is disposed between the annular protrusion 11112 and the edge part 1122, the second portion 1322 is disposed between the inner wall of the housing 111 and an outer peripheral surface of the edge part 1122, the third portion 1323 is disposed between the folded part 11111 and the edge part 1122, the second portion 1322 connects the first portion 1321 and the third portion 1323, and the body part 131 is connected to the first portion 1321.

The sealing part 132 is formed by successively connecting the first portion 1321, the second portion 1322 and the third portion 1323, so that the edge part 1122 is completely wrapped and the insulating effect is good; on the other hand, the three portions of the sealing part 132 are respectively clamped and fixed, and the insulating member 13 is stably mounted and cannot be easily displaced so as to avoid losing the sealing effect and the effect of buffering the vibration, thereby prolonging the service life of the battery cell 1.

According to some embodiments of the present application, optionally, as shown in FIG. 6 and FIG. 10, the end cover body 1121 includes a planar part and a transition part 11212, the transition part 11212 is provided around the planar part 11211, and the transition part 11212 extends from the planar part 11211 in a radial direction of the housing 111 and in a direction close to the electrode assembly 12, and the transition part 11212 connects the planar part 11211 and the edge part 1122.

In the height direction H of the battery cell, a projection of the electrode assembly 12 on the end cover 112 mainly falls on the planar part 11211, and by providing the transition part 11212, the transition part 11212 guides the planar part 11211 away from the electrode assembly 12 relative to the edge part 1122, and a distance between the planar part 11211 and the electrode assembly 12 is increased to avoid the electrode assembly 12 vibrating to hit the end cover 112, which further mitigates the rigid collision between the electrode assembly 12 and the end cover 112. Further, the planar part 11211 being away from the electrode assembly 12 also plays a role in increasing the inner space of the battery cell 1, which is beneficial to increasing the energy density of the battery cell 1.

According to some embodiments of the present application, optionally, as shown in FIG. 6, in a direction away from the electrode assembly, an outer surface of the planar part 11211 is not beyond an outer surface of the folded part 11111.

The direction away from the electrode assembly 12 refers to a direction away from the electrode assembly in the height direction H of the battery cell.

The outer surface of the planar part 11211 is not beyond the outer surface of the folded part 11111, so that the end surface of the shell 11 is flat without a protrusion 131221; and the planar part 11211 does not occupy the outer space of the battery cell 1, does not increase the overall volume of the battery cell 1, does not reduce the energy density of the battery cell 1, and ensures that the battery cell 1 has a higher energy density. Furthermore, when a plurality of battery cells 1 are combined to form a battery 100, in the height direction H of the battery cell, there is a small gap between adjacent battery cells 1, and there is a small gap between the battery cells 1 and a plane on which the battery cells 1 are placed, thereby reducing the waste of space and improving the energy density of the battery 100.

The planar part 11211 is not beyond the outer surface of the folded part 11111, to avoid damage caused by interference between the planar part 11211 and the structure outside the battery cell 1 and protect the end cover 112, thereby prolonging the service life of the battery cell 1.

Figure 11:
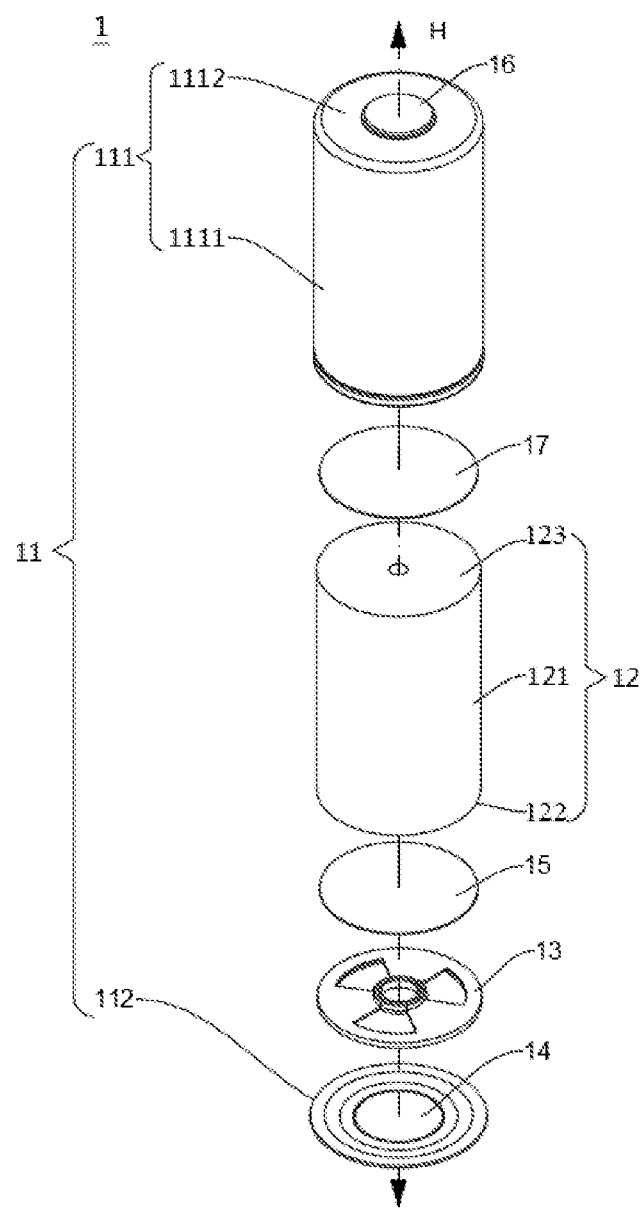
FIG. 11 is an exploded view of a battery cell and an electrode assembly provided by an embodiment of the present application.

According to some embodiments of the present application, optionally, in combination with FIG. 4 and FIG. 11, a first tab 122 is provided at an end of the electrode assembly 12 toward the end cover 112, and the battery cell 1 further includes: a first current collecting member 15, configured to electrically connect the first tab 122 and the housing 111, the first current collecting member 15 is disposed between the electrode assembly 12 and the insulating member 13, and the insulating member 13 abuts against the first current collecting member 15 to elastically support the electrode assembly 12.

The electrode assembly 12 includes a first electrode sheet, a second electrode sheet, and an isolating member, and the isolating member is configured to isolate the first electrode sheet from the second electrode sheet. The first and second electrode sheets are of opposite polarities, in other words, one of the first and second electrode sheets is a positive electrode sheet and the other of the first and second electrode sheets is a negative electrode sheet. The first electrode sheet, the second electrode sheet and the isolating member are prior art, and although not shown in the accompanying drawings of the description of the present application, a person skilled in the art would have been able to understand the specific structures thereof. Viewed from the outline of the electrode assembly 12, the electrode assembly 12 includes a main body part 121, a first tab 122, and a second tab 123, and the first tab 122 and the second tab 123 protrude from the main body part 121. The first tab 122 is a portion of the first electrode sheet that is not coated with an active substance layer, and the second tab 123 is a portion of the second electrode sheet that is not coated with an active substance layer. The first tab 122 and the second tab 123 may protrude from the same side of the main body part 121 or may protrude from opposite sides, respectively. Exemplarily, as shown in FIG. 4, the first tab 122 and the second tab 123 are respectively provided at two ends of the main body part 121, that is, the first tab 122 and the second tab 123 are respectively located at two ends of the electrode assembly 12.

The first current collecting member 15 is a component configured to electrically connect the first tab 122 and an electrode lead-out part of the shell 11 to transport electric energy from the electrode assembly 12 to the electrode lead-out part. Electric energy is transported to the outside of the battery cell 1 through the electrode lead-out part. The plurality of battery cells 1 are electrically connected via a bus component so as to realize series connection, parallel connection or series-parallel connection of the plurality of battery cells 1. Optionally, as shown in FIG. 6, one side of the first current collecting member 15 is electrically connected to the first tab 122 of the electrode assembly 12, and the other side of the first current collecting member 15 is electrically connected to the annular protrusion 11112, so that the housing 111 is charged, and the housing 111 serves as the electrode lead-out part. The way of electrical connection may be conducting by contact, bonding by conductive adhesives, or welding.

As shown in FIG. 6, the insulating member 13 indirectly supports the electrode assembly 12 through the first current collecting member 15. When the electrode assembly 12 vibrates, the insulating member 13 can not only buffer the amplitude of vibration of the electrode assembly 12, but also maintain the amplitude of vibration of the first current collecting member 15 and the electrode assembly 12 relatively consistent, and reduce the pulling force between the first current collecting member 15 and the electrode assembly 12 to avoid the first tab 122 being torn and avoid the connecting part between the first current collecting member 15 and the electrode assembly 12 being torn, which improves the connection reliability of the first current collecting member 15 and the electrode assembly 12 and prolongs the service life of the battery cell 1.

According to some embodiments of the present application, optionally, in combination with FIG. 4 and FIG. 11, a second tab 123 is provided at an end of the electrode assembly 12 away from the end cover 112, and the battery cell 1 further includes: an electrode terminal 16 mounted in the housing 111 in an insulating manner; and a second current collecting member 17, configured to electrically connect the second tab 123 and the electrode terminal 16.

The second current collecting member 17 is a component configured to electrically connect the second tab 123 and the other electrode lead-out part of the shell 11 to transport electric energy from the electrode assembly 12 to the other electrode lead-out part. Electric energy is transported to the outside of the battery cell 1 through the electrode lead-out part. The plurality of battery cells 1 are electrically connected via a bus component so as to realize series connection, parallel connection or series-parallel connection of the plurality of battery cells 1.

Optionally, as shown in FIG. 4, one side of the second current collecting member 17 is pressed against the second tab 123 of the electrode assembly 12 and they are electrically connected, and the other side of the second current collecting member 17 is electrically connected to the electrode terminal 16, which serves as the electrode lead-out part. The way of electrical connection may be contact conduction, bonding by conductive adhesive, or welding.

In the foregoing solution, under the buffering action of the insulating member 13, the vibration amplitude of vibration of the electrode assembly 12 is reduced, thereby reducing the pulling force between the first current collecting member 15 and the electrode assembly 12; the second tab 123 is not easily torn, the connecting part of the second tab 123 and the second current collecting member 17 is not easily torn, and the connecting part of the second current collecting member 17 and the electrode terminal 16 is not easily torn, which improves the electrical connection reliability of the electrode assembly 12 and the electrode terminal 16, ensures stable passing current and prolongs the service life of the battery cell 1.

Optionally, a bottom wall 1112 of the housing 111 and the electrode terminal 16 serve as electrode lead-out parts, respectively, so that the bus component can be connected at the same end of the battery cell 1 when the battery 100 is assembled, which simplifies the structure of the battery 100, and is also convenient to provide the pressure relief mechanism 14 at the end of the battery cell 1 away from the bus component to relieve the internal pressure, so as to avoid damage of the bus component when the pressure relief mechanism 14 is actuated.

In a second aspect, an embodiment of the present application provides a battery 100, as shown in FIG. 2, the battery 100 includes the foregoing battery cell 1.

In a third aspect, an embodiment of the present application provides a power consumption apparatus, as shown in FIG. 1, the power consumption apparatus is a vehicle 1000, the battery 100 is provided with the foregoing battery 100, and the battery 100 is configured to provide electric energy to a motor 200 of the vehicle 1000 and to other functional components such as a controller 300.

Figure 12:
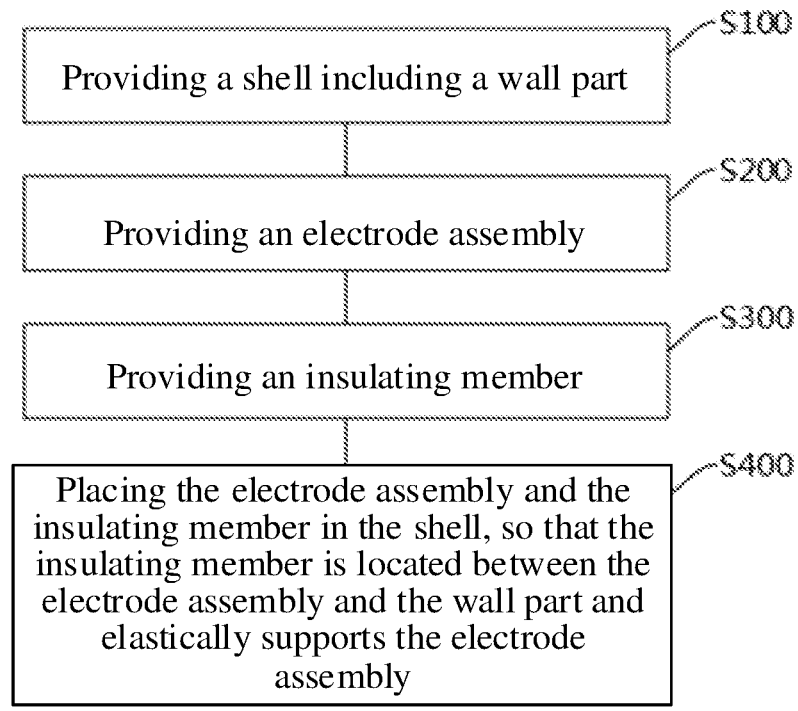
FIG. 12 is a schematic flow diagram of a manufacturing method of a battery cell provided by an embodiment of the present application.

In a fourth aspect, as shown in FIG. 12, an embodiment of the present application provides a manufacturing method of a battery cell 1, and the manufacturing method includes:

S100, providing a shell 11 including a wall part 11a;

S200, providing an electrode assembly 12;

S300, providing an insulating member 13; and

S400, placing the electrode assembly 12 and the insulating member 13 in the shell 11, so that the insulating member 13 is located between the electrode assembly 12 and the wall part 11a and elastically supports the electrode assembly 12, to isolate the wall part 11a from the electrode assembly 12 in an insulating manner and buffer vibration of the electrode assembly 12 within the shell 11.

It should be noted that, for the structure of the battery cell 1 manufactured by the foregoing manufacturing method of the battery cell 1, reference is made to the battery cell 1 provided in each of the foregoing embodiments.

When the battery cell 1 is assembled based on the foregoing manufacturing method of the battery cell 1, it is not necessary to be sequentially performed according to the foregoing steps, that is, the steps may be performed in an order mentioned in the embodiments, may be performed in an order different from the order mentioned in the embodiments, or several steps may be performed simultaneously. For example, steps S100 and S200 may be performed in no particular order, or performed simultaneously.

Figure 13:
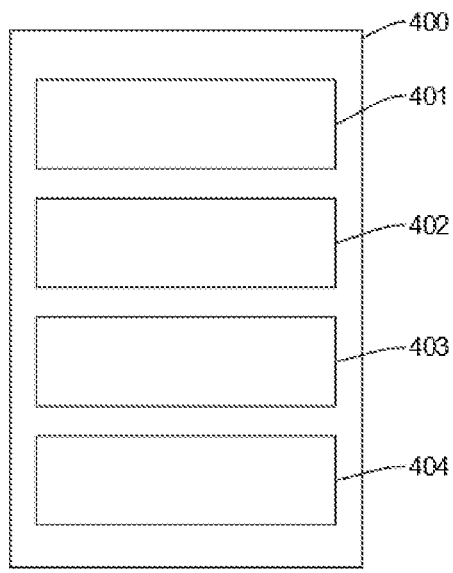
FIG. 13 is a schematic block diagram of a manufacturing device of a battery cell provided by an embodiment of the present application.

In a fifth aspect, an embodiment of the present application provides a manufacturing device 400 of a battery cell 1, as shown in FIG. 13, the manufacturing device 400 includes:

a first providing apparatus 401, configured to provide a shell 11 including a wall part 11a;

a second providing apparatus 402, configured to provide an electrode assembly 12;

a third providing apparatus 403, configured to provide an insulating member 13; and an assembling apparatus 404, configured to place the electrode assembly 12 and the insulating member 13 into the shell 11, so that the insulating member 13 is located between the electrode assembly 12 and the wall part 11a and elastically supports the electrode assembly 12, to isolate the wall part 11a from the electrode assembly 12 in an insulating manner and buffer vibration of the electrode assembly 12 within the shell 11.

For the structure of the battery cell 1 manufactured by the foregoing manufacturing system, reference is made to the battery cell 1 provided in each of the foregoing embodiments.

It shall be noted that the embodiments of the present application and the features in the embodiments may be combined with each other in the case of no conflict.

According to an embodiment of the present application, referring to FIGS. 2 to 11, the embodiment of the present application provides a cylindrical battery cell 1 including a shell 11, an electrode assembly 12, and an insulating member 13. The shell 11 includes a housing 111 and an end cover 112, the housing 111 includes a bottom wall 1112 and a side wall 1111 provided around the bottom wall 1112, an opening is provided at an end of the side wall 1111 away from the bottom wall 1112, and the end cover 112 covers the opening so as to isolate the inner space of the shell 11 from the outer space thereof. An electrode terminal 16 is provided on the bottom wall 1112 in an insulating manner. An annular protrusion 11112 is provided on the side wall 1111, and an edge of the side wall 1111 is folded toward the inside of the housing 111 to form a folded part 11111. Specifically, the end cover 112 includes an end cover body 1121 and an edge part 1122, the edge part 1122 is provided around the end cover body 1121, and is clamped between the annular protrusion 11112 and the folded part 11111 to realize the mechanical connection between the housing 111 and the end cover 112. The end of the electrode assembly 12 close to the end cover 112 has a first tab 122 and the end of the electrode assembly 12 close to the electrode terminal 16 has a second tab 123. The battery cell 1 further includes a first current collecting member 15, and a second current collecting member 17, the first current collecting member 15 is connected to the first tab 122 and the annular protrusion 11112, and the second current collecting member 17 is connected to the second tab 123 and the electrode terminal 16, so that the electrode terminal 16 and the bottom wall 1112 are respectively charged with opposite electric charges, to draw electric energy from the same end of the battery cell 1. The insulating member 13 includes a sealing part 132 and a body part 131. The sealing part 132 covers the edge part 1122 to insulate and seal the end cover 112 and the housing 111. The body part 131 includes a supporting part 1311 and a connecting part 1312. The supporting part 1311 is an annular structure 13111 configured to support the electrode assembly 12. The connecting part 1312 includes a plurality of connecting arms 13122, the plurality of connecting arms 13122 are distributed around the supporting part 1311 at intervals and respectively connect the supporting part 1311 and the sealing part 132. The connecting arms 13122 are elastically deformed to buffer the vibration of the electrode assembly 12.

The foregoing descriptions are merely preferred embodiments of the present application, and are not intended to limit the present application. For a person of skilled in the art, the present application may have various modifications and variations. Any modification, equivalent replacement, improvement, or the like made within the spirit and principle of the present application shall fall within the protection scope of present application.

What is claimed is:

1. A battery cell, comprising:

a shell comprising a wall part;

an electrode assembly disposed within the shell; and an insulating member disposed between the electrode assembly and the wall part to isolate the wall part from the electrode assembly in an insulating manner;

wherein the insulating member is configured to elastically support the electrode assembly to buffer vibration of the electrode assembly within the shell;

wherein the shell comprises a housing and an end cover, the housing has an opening, the end cover covers the opening, and the wall part is the end cover;

wherein the insulating member comprises:

a body part disposed between the end cover and the electrode assembly to support the electrode assembly, the body part being configured to undergo elastic deformation when the electrode assembly vibrates; and a sealing part provided around the body part, the sealing part being disposed between the end cover and the housing, so that the end cover and the housing are hermetically connected and insulated from each other; and wherein the body part comprises a supporting part and a connecting part, the supporting part is configured to support the electrode assembly, the connecting part is provided on a periphery of the supporting part and configured to connect the supporting part and the sealing part, and the connecting part is configured to undergo elastic deformation when the electrode assembly vibrates.

2. The battery cell according to claim 1, wherein a gap exists between the body part and the end cover to allow the body part to be deformed in a direction of the end cover.

3. The battery cell according to claim 1, wherein the supporting part protrudes from the connecting part towards the electrode assembly.

4. The battery cell according to claim 1, wherein the supporting part possesses an annular structure.

5. The battery cell according to claim 1, wherein the battery cell further comprises a pressure relief mechanism, the pressure relief mechanism is disposed on the end cover and configured to be actuated when an internal pressure or temperature of the battery cell reaches a threshold, to relieve the internal pressure, and a projection of the supporting part on the end cover overlaps the pressure relief mechanism.

6. The battery cell according to claim 5, wherein a protrusion is provided on a side of the connecting part toward the end cover, and a projection of the protrusion on the wall part does not overlap the pressure relief mechanism.

7. The battery cell according to claim 1, wherein the connecting part comprises a plurality of connecting arms, the plurality of connecting arms are distributed around the supporting part at intervals, one end of each of the connecting arms is connected to an outer peripheral surface of the supporting part, and the other end thereof is connected to the sealing part.

8. The battery cell according to claim 7, wherein the connecting arm comprises a flat straight segment and an inclined segment, the flat straight segment extends from the supporting part in a radial direction of the housing, the inclined segment extends from the flat straight segment in the radial direction of the housing and in a direction away from the electrode assembly, and the inclined segment connects the flat straight segment and the sealing part.

9. The battery cell according to claim 8, wherein a thickness of the inclined segment gradually decreases in a direction where the sealing part points to the flat straight segment.

10. The battery cell according to claim 7, wherein a reinforcing rib is provided on the outer peripheral surface of the supporting part, the reinforcing rib extends in a peripheral direction of the supporting part, and two ends of the reinforcing rib are respectively connected to two adjacent connecting arms.

11. The battery cell according to claim 1, wherein an end of the housing provided with the opening is inwardly folded to form a folded part, an annular protrusion is provided on an inner wall of the housing, and the annular protrusion extends in a peripheral direction of the housing; and the end cover comprises an end cover body and an edge part, the edge part is provided around the end cover body and located between the folded part and the annular protrusion, and the sealing part is configured to cover the edge part.

12. The battery cell according to claim 11, wherein the sealing part comprises a first portion, a second portion and a third portion, the first portion is disposed between the annular protrusion and the edge part, the second portion is disposed between the inner wall of the housing and an outer peripheral surface of the edge part, the third portion is disposed between the folded part and the edge part, the second portion connects the first portion and the third portion, and the body part is connected to the first portion.

13. The battery cell according to claim 11, wherein the end cover body comprises a planar part and a transition part, the transition part is provided on a periphery of the planar part, the transition part extends from the planar part towards the electrode assembly in a radial direction of the housing, and the transition part connects the planar part and the edge part.

14. The battery cell according to claim 13, wherein in a direction away from the electrode assembly, an outer surface of the planar part is not beyond an outer surface of the folded part.

15. The battery cell according to claim 1, wherein a first tab is provided at an end of the electrode assembly facing toward the end cover, and the battery cell further comprises:
a first current collecting member, configured to electrically connect the first tab and the housing, the first current collecting member being disposed between the electrode assembly and the insulating member, and the insulating member abutting against the first current collecting member to elastically support the electrode assembly.

16. The battery cell according to claim 1, wherein a second tab is provided at an end of the electrode assembly away from the end cover, and the battery cell further comprises:
an electrode terminal mounted in the housing in an insulating manner; and
a second current collecting member, configured to electrically connect the second tab and the electrode terminal.

17. A battery, comprising the battery cell according to claim 1.

* * * * *